(12) United States Patent
Nozzarella

(10) Patent No.: US 10,384,504 B2
(45) Date of Patent: Aug. 20, 2019

(54) TRANSPORT TRAILER

(71) Applicant: SnoBear USA, Inc., Isanti, MN (US)

(72) Inventor: Mario J. Nozzarella, Isanti, MN (US)

(73) Assignee: SnoBear USA, Inc., Isanti, MN (US)

( * ) Notice: Subject to any disclaimer, the term of this patent is extended or adjusted under 35 U.S.C. 154(b) by 0 days.

(21) Appl. No.: 15/381,973

(22) Filed: Dec. 16, 2016

(65) Prior Publication Data

US 2017/0297394 A1 Oct. 19, 2017

Related U.S. Application Data

(60) Provisional application No. 62/268,026, filed on Dec. 16, 2015.

(51) Int. Cl.
| | | |
|---|---|---|
| *B60F 3/00* | (2006.01) | |
| *A63C 5/00* | (2006.01) | |
| *B60P 3/38* | (2006.01) | |
| *B62B 15/00* | (2006.01) | |
| *B62B 17/04* | (2006.01) | |

(52) U.S. Cl.
CPC .............. *B60F 3/0092* (2013.01); *A63C 5/00* (2013.01); *B60F 3/0038* (2013.01); *B60P 3/38* (2013.01); *B62B 15/007* (2013.01); *B62B 17/04* (2013.01)

(58) Field of Classification Search
CPC ........ B60F 3/0092; B60F 5/00; B60F 3/0038; B62D 13/06; B62D 63/06; B62D 1/24
See application file for complete search history.

(56) References Cited

U.S. PATENT DOCUMENTS

| | | | |
|---|---|---|---|
| 3,464,735 A | | 9/1969 | Smith |
| 3,656,557 A | | 4/1972 | Eskelson |
| 3,685,404 A | | 8/1972 | Rich et al. |
| RE29,356 E | | 8/1977 | Bennett |
| 4,344,637 A | | 8/1982 | Williams, Jr. et al. |
| 4,389,066 A | * | 6/1983 | Weir ...................... A61G 1/007 280/19.1 |
| 4,523,398 A | | 6/1985 | Scheibel et al. |
| 4,631,877 A | * | 12/1986 | Molodecki ............ E04H 1/1205 280/19.1 |
| 4,736,961 A | | 4/1988 | Latvys |
| 4,836,578 A | | 6/1989 | Soltis |
| 5,341,588 A | * | 8/1994 | Lizotte ................... A01K 97/01 135/901 |
| 5,622,198 A | * | 4/1997 | Elsinger ................. E04B 1/344 135/116 |
| 5,918,890 A | * | 7/1999 | Willems ................. B62D 63/06 280/18 |
| 6,032,752 A | | 3/2000 | Karpik et al. |

(Continued)

*Primary Examiner* — Hau V Phan
(74) *Attorney, Agent, or Firm* — Dicke, Billig & Czaja, PLLC

(57) ABSTRACT

A trailer system for transporting multiple adult passengers and/or supplies over harsh terrain (e.g., snow, ice, wetland, etc.) when towed behind a vehicle. The trailer system includes a cabin, first and second skis, and first and second suspension assemblies. The suspension assemblies connect the skis, respectively, with the cabin. The suspension assemblies incorporate multiple pivot points that effectively isolate the skis from cabin, and promote true "tracking" of the trailer system relative to the towing vehicle. In some embodiments, the cabin has a highly buoyant construction, allowing the trailer system to float in water.

14 Claims, 5 Drawing Sheets

(56) References Cited

U.S. PATENT DOCUMENTS

| | | | |
|---|---|---|---|
| 6,036,201 A | | 3/2000 | Pond et al. |
| 6,279,931 B1 | | 8/2001 | Kopczynski |
| 6,401,852 B2 | | 6/2002 | Lillbacka et al. |
| 6,899,191 B1 | | 5/2005 | Lykken |
| 6,905,128 B1 | * | 6/2005 | Lear ................. B62B 13/12 280/16 |
| 6,948,280 B2 | * | 9/2005 | Marcinkowski .... E04B 1/34321 446/478 |
| 8,007,047 B2 | * | 8/2011 | Kennedy ................. E04H 9/12 299/12 |
| 8,191,564 B1 | | 6/2012 | Lindholm |
| 8,678,515 B2 | * | 3/2014 | Kennedy ................. E21F 11/00 299/12 |
| 8,763,315 B2 | * | 7/2014 | Hartman ............... E04B 1/3445 52/71 |
| 8,857,825 B1 | * | 10/2014 | Johnson ................. B60D 1/24 280/19.1 |
| 9,487,225 B1 | * | 11/2016 | Looman ................. B62B 13/06 |
| 2002/0084123 A1 | | 7/2002 | Farsdale |
| 2003/0051376 A1 | | 3/2003 | Lassonde et al. |
| 2009/0091097 A1 | * | 4/2009 | Deiseroth ............... B62B 13/16 280/20 |

* cited by examiner

TRANSPORT TRAILER

CROSS-REFERENCE TO RELATED APPLICATIONS

This Non-Provisional Patent Application claims the benefit of the filing date of U.S. Provisional Patent Application Ser. No. 62/268,026, filed Dec. 16, 2015, entitled "TRANSPORT TRAILER," which is herein incorporated by reference.

BACKGROUND

The present disclosure relates to transportation of people, equipment and/or supplies over harsh terrains. More particularly, it relates to transportable enclosed structures suitable for towing over various terrains, such as ice, snow, marsh, wetlands, etc.

Many winter activities entail transportation over ice and/or snow. One highly popular example is ice fishing; ice fishermen often travel on vehicles suited for traversing ice and snow in order to reach their desired ice fishing destination. Vehicles useful for longer distance trips over ice and snow (e.g., snow-covered ice) include, for example, snowmobiles and ATVs. In these and other scenarios, the ice fishermen will oftentimes have equipment and supplies they wish to transport to the destination. To meet this need, ice sleds are commonly available, and are generally adapted to be towed behind the snowmobile or ATV. Similarly, ice fish houses can be designed for towing across snow/ice (e.g., sliders or runners are fastened to the bottom of the ice fish house).

A snowmobile, ATV and the like can be viable for transporting one or perhaps two people, towing a small number of relatively small items in an ice sled. In many situations, however, this arrangement is less than optimal. Snowmobiles and ATVs offer little protection against harsh winter elements, and can become quite uncomfortable when ridden for long distances. Moreover, only a few items can be towed by the snowmobile or ATV in the ice sled.

More recently, large scale powered vehicles have been developed, capable of comfortably transporting multiple people over ice and snow. In particular, a highly popular ice and snow recreational vehicle is available under the trade name SNOBEAR™ from SnoBear USA, LLP. The SNOBEAR vehicle can seat a large number of passengers, and includes various amenities desired by ice fishermen. The SNOBEAR vehicle employs a powered track drive system for propelling over snow and ice, along with front skis for steering. An even larger ice and snow vehicle is also available from SnoBear USA, LLP under the trade name THE GRIZZ™. Even with the increased occupancy and storage available with these and similar vehicles, some users desire even more space. While a conventional ice sled could be used, passengers cannot ride in the ice sled and only minimal storage space is provided. Further, ice sleds and the like are not designed to smoothly travel behind a large scale ice and snow vehicle.

In light of the above, a need exits for a trailer capable of transporting multiple people and/or their supplies in an enclosed environment and appropriate for towing across snow and ice, as well as other harsh terrains such as marshes or wetlands.

SUMMARY

Some aspects of the present disclosure are directed toward a trailer system for transporting multiple adult passengers and/or supplies over various surfaces or terrains (e.g., snow, ice, marshes, etc.) when towed behind a vehicle. The trailer system includes a cabin, first and second skis, and first and second suspension assemblies. The suspension assemblies connect the skis, respectively, with the cabin. The suspension assemblies incorporate multiple pivot points that effectively isolate the skis from cabin, and promote true "tracking" of the trailer system relative to the towing vehicle. In some embodiments, the cabin has a highly buoyant construction, allowing the trailer system to float in water.

In some embodiments, the cabin includes various amenities, such as sleeping quarters and traveling quarters. The cabin can be heated, and can provide latched holes for ice fishing. The suspension assemblies can be interconnected by an actuator system that facilitates user-prompted raising and lowering of the cabin relative to ground.

DETAILED DESCRIPTION

Figure 1A:
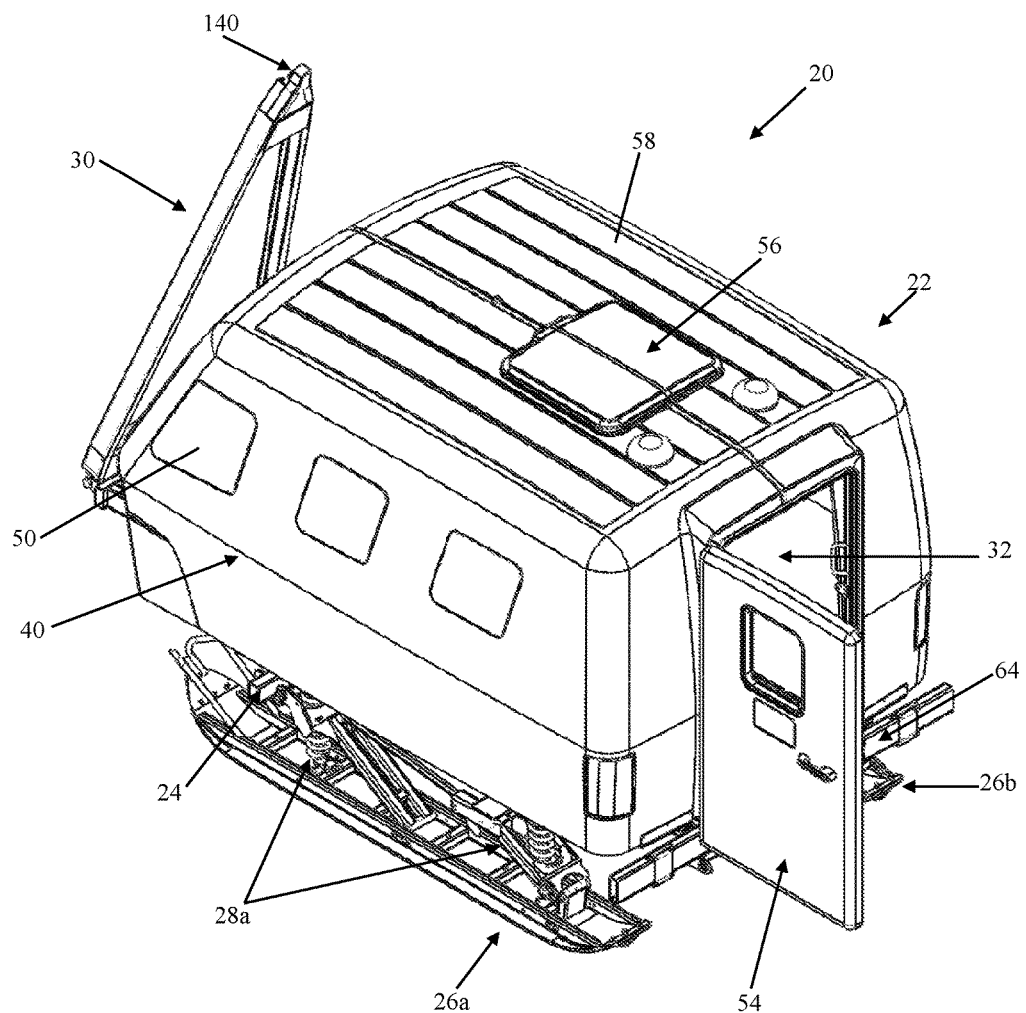
FIG. 1A is a rear perspective view of a trailer system in accordance with principles of the present disclosure.
Figure 1B:
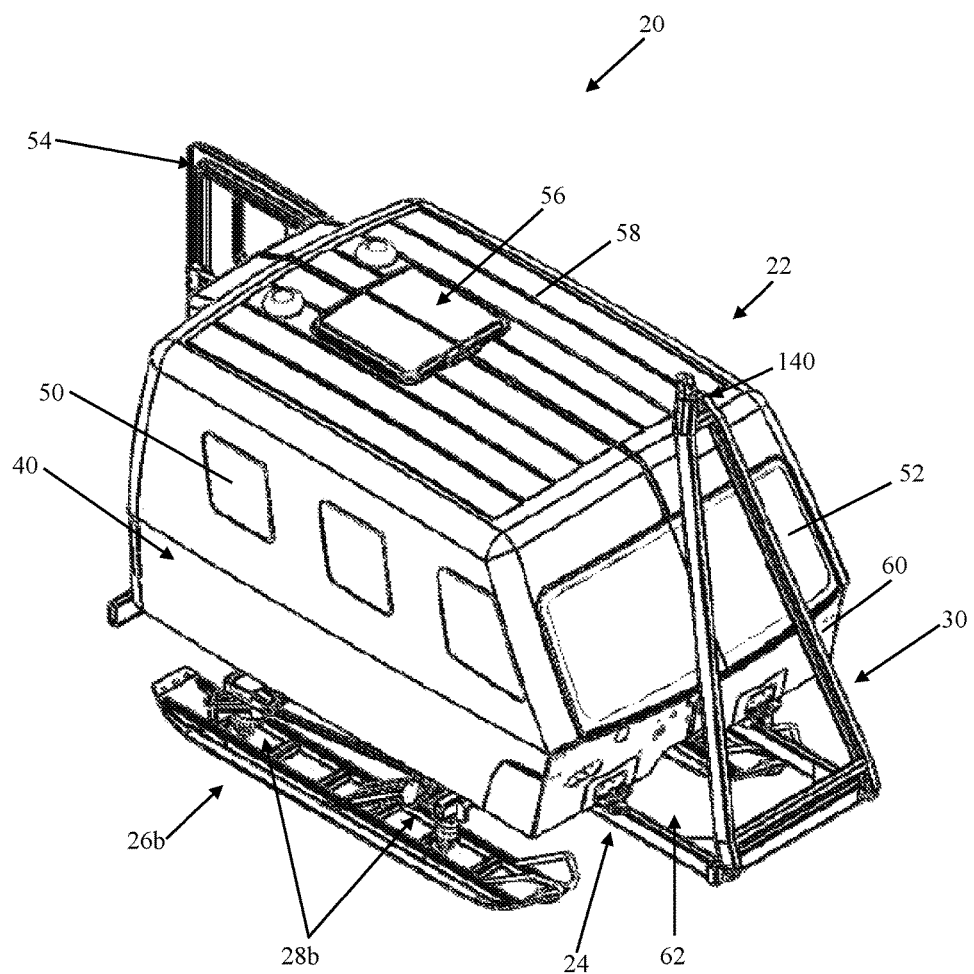
FIG. 1B is a front perspective view of the trailer system of FIG. 1A.

One embodiment of a trailer system 20 in accordance with principles of the present disclosure is shown in FIGS. 1A and 1B. The trailer system 20 is configured for towing across various surfaces or terrains (e.g., harsh terrains including ice, snow, marshes, wetlands, etc.), and generally includes a cabin 22, a frame or chassis 24, first and second ski assemblies 26a, 26b, first and second suspension assemblies 28a, 28b, and a tongue 30. Details on the various components are provided below. In general terms, the cabin 22 provides an enclosed area 32 (referenced generally in FIG. 1A) sized and shaped to comfortably seat at least two adult passengers, cargo, etc., and optionally incorporates various amenities as described below. The frame 24 connects and supports the cabin 22 relative to the suspension assemblies 28a, 28b and the tongue 30. The suspension assemblies 28a, 28b, in turn, link the ski assemblies 26a, 26b, respectively, to the frame 24. The ski assemblies 26a, 26b are configured for readily traversing across, for example, ice and snow. Finally, the tongue 30 is configured for connection to a hitch of a tow vehicle (not shown). With this construction, the trailer system 20 conveniently transports numerous passengers, equipment and/or supplies across various surfaces or terrains when towed behind an appropriate vehicle.

The cabin 22 can assume a variety of forms, and generally includes a housing 40 that optionally assumes the shape reflected in FIGS. 1A and 1B. In some embodiments, the housing 40 has a foam-filled fiberglass construction, although other configurations (e.g., hollow fiberglass, plastic, metal, etc.) are also envisioned. With embodiments incorporating a foam-filled structure, the foam is optionally selected to provide a buoyancy sufficient for floatation of the trailer system 20 in water even when the cabin 22 is occupied and/or carrying supplies (e.g., if the trailer system 20 were traveling across a frozen body of water and broke through the ice, the trailer system 20 would float due to a buoyancy of the cabin 22 (via the foam fill)). In some embodiments, the foam exhibits floatation properties on the order of 64 pounds of buoyancy per cubic foot (64 lb/ft³ buoyancy), although other buoyancy properties are also envisioned. The floatation properties can be provided, for example, by using a 2 pound density urethane or similar foam.

The housing 40 defines the enclosed area 32 to have a length on the order of 10 feet, a width on the order of 6 feet, and a height on the order of 6 feet in some embodiments. With these optional dimensions, two or more (optionally six or more, optionally as many as ten) adult passengers can comfortably occupy the enclosed area 32, able to stand, sit, lie down, etc. Further, sufficient additional room is available for storing cargo, supplies, equipment. Thus, the trailer system 20 is well-suited for transporting one or more of passengers, supplies, commercial goods, etc. when towed by a vehicle (not shown).

Various features are optionally incorporated into the cabin 22 to enhance the passengers' experience. For example, viewing windows can be formed in the housing, such as side windows 50 and a front window 52. A rear door 54 is mounted to the housing 40 to facilitate passenger/supply loading and unloading. In some embodiments, the rear door 54 (and corresponding opening in the housing 40) is sized and shaped to be handicap accessible. An escape hatch 56 is optionally provided at a roof 58 of the housing 40, providing an alternate means for passengers to exit the enclosed area 32 in case of emergency.

Other optional amenities can be provided with the cabin 22 and not directly visible in the drawings. For example, sleeping quarters (e.g., bunk beds) and travel quarters (e.g., chairs or seating) can be provided within the enclosed area 32, along with cabinets, table tops, etc. The enclosed area 32 can be heated (e.g., propane heater system), and auxiliary heaters can also be included. Built-in, adaptable latched holes can be formed in a floor of the housing 40, such that the cabin 22 effectively serves as a portable ice fish house (e.g., a user can participate in ice fishing activities through one the latched holes).

The frame 24 is mounted to a bottom of the cabin 22, and can be formed of a structurally robust material such as stainless steel. As best shown in FIG. 1B, the frame 24 projects beyond a front side 60 of the cabin 22, and optionally forms a storage zone 62. The storage zone 62 can be open as shown, configured to receive and support an auxiliary item (not shown) having a corresponding size and shape. For example, the auxiliary item can be a covered container, box (e.g., dump box), etc., available for temporary storage (e.g., serving as a dry storage compartment). A plethora of other items can alternatively be mounted to the storage zone 62, such as equipment (e.g., generator), etc. In other embodiments, a deck or platform (not shown) can be included with the storage zone 62, providing a surface to which one or more auxiliary items can be secured.

Additional features can optionally be formed by or assembled to the frame 24. For example, a hitch unit 64 (identified generally in FIG. 1A) can be provided along the frame 24 rearward of the cabin 22. The hitch unit 64 can assume various forms, and is generally configured to facilitate hitched connection with the tongue 30 of a second trailer assembly 20 (i.e., a first one of the trailer systems 20 can be hitched to a towing vehicle, and a second one of the trailer systems 20 can be hitched to the first).

Figure 2:
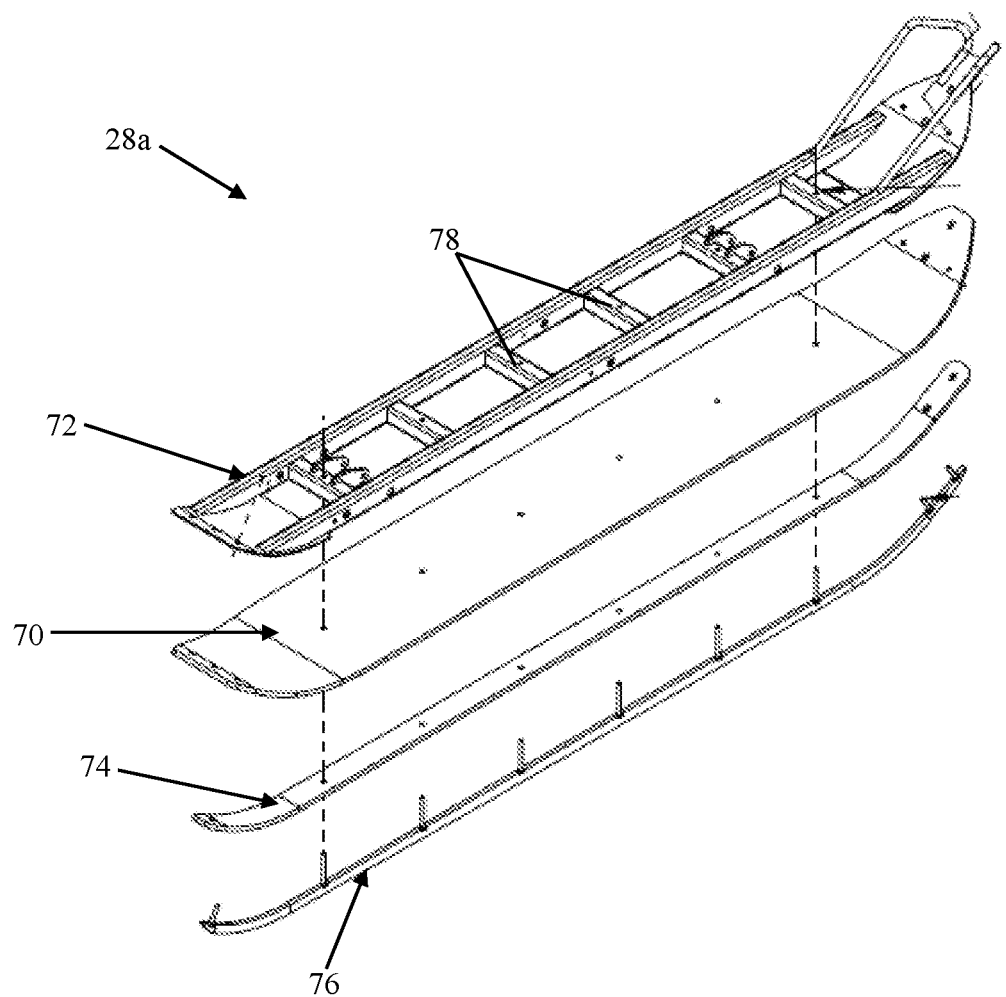
FIG. 2 is an exploded perspective view of a ski assembly useful with the trailer system of FIGS. 1A and 1B.

The ski assemblies 26a, 26b can be identical, and FIG. 2 illustrates one embodiment of the ski assembly 26a in greater detail. The ski assembly 26a can include a base 70, a frame 72, a bottom or runner 74, and a skag 76. The base 70 can have a conventional design useful with other snow and ice vehicles, and is sometimes referred to as a "skin". The frame 72 is assembled to an upper surface of the base 70, and includes various cross-bars 78 that facilitate mounting to the corresponding suspension assembly 28a, 28b (FIGS. 1A and 1B). The runner 74 is mounted to a lower surface of the base 70, and provides a supported interface between the base 70 and the skag 76. The skag 76 can be a generally cylindrical metallic apparatus that protrudes downward and extends the length of the runner 74. As is known in the art, the skag 76 provides a degree of resistance to the abrasive forces along the point of contact between the ski assembly 26a and a ground surface along which the trailer system 20 (FIGS. 1A and 1B) is being towed, and also lessens a tendency of the ski assembly 26a to slide laterally in certain operational situations. Alternatively, the ski assemblies 26a, 26b can assume a wide variety of other formats as known in the art.

Figure 3:
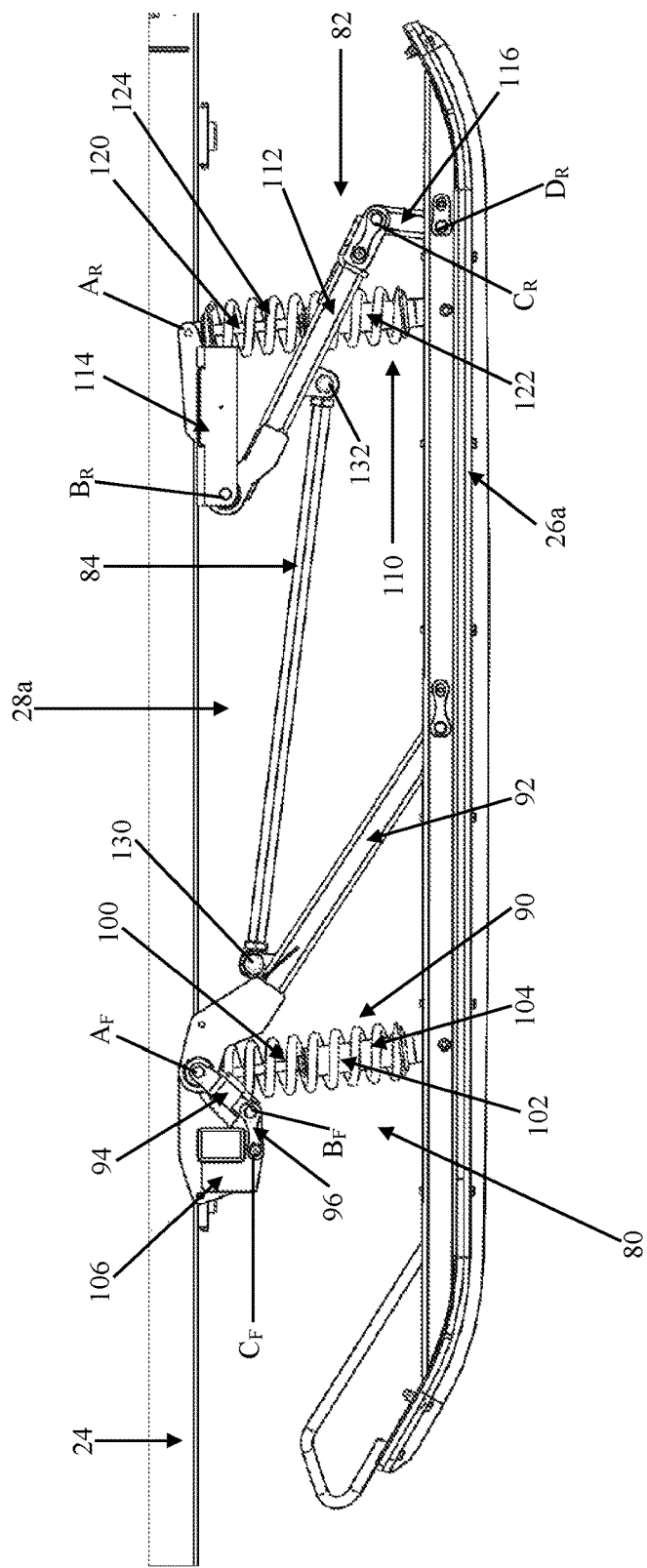
FIG. 3 is a side view of a suspension assembly useful with the trailer system of FIGS. 1A and 1B.

Returning to FIGS. 1A and 1B, the suspension assemblies 28a, 28b can be identical in some embodiments, and effectively isolate the corresponding ski assembly 26a, 26b from the cabin 22 such that passengers in the cabin 22 experience a smooth ride as the trailer assembly 20 is towed over ice and snow. With this in mind, one embodiment of the first suspension assembly 28a is shown in greater detail in FIG. 3, and generally includes a front suspension sub-assembly 80, a rear suspension sub-assembly 82, and a connecting rod 84. The front and rear suspension sub-assemblies 80, 82 link the first ski assembly 26a and to the frame 24 (and thus the cabin 22 (FIGS. 1A and 1B)), with the sub-assemblies 80, 82 being located at opposite sides of a center of gravity of the cabin 22. In some embodiments, the suspension assembly 28a can be akin to the internal frames disclosed in U.S. Pat. No. 6,971,466 to Lykken, the entire teachings of which are incorporated herein by reference.

The front suspension sub-assembly 80 can include a front shock absorber 90, a front suspension arm 92, a front rocker 94 and a link arm 96. The front shock absorber 90 can be of a conventional design including a reciprocal piston 100 within a cylinder 102 and spring 104 combination. The front shock absorber 90 is connected at a lower end to the ski assembly 26a (e.g., via one of the cross-bars 78 shown in FIG. 2). An upper end of the front shock absorber 90 is pivotably attached to the front suspension arm 92 and the front rocker 94; the front suspension arm 92 and the front rocker 94 can each rotate relative to the front shock absorber 90 (and relative to each other) about a first pivot point $A_F$. The front suspension arm 92 extends rearwardly from the first pivot point $A_F$ and is connected at a lower end thereof to the ski assembly 26a (e.g., via another one of the cross-bars 78 shown in FIG. 2). The front rocker 94 is connected to the frame 24 (and thus the cabin 22 (FIGS. 1A and 1B) via the link arm 96. In particular, the front rocker 94 and the link arm 96 are pivotably connected, and can rotate relative to one another about a second pivot point $B_F$. The link arm 96 is pivotably connected with the frame 24 (e.g., via a bracket 106 that in turn is connected to the frame 24 either directly or by a sub-carriage (not shown)) such that the link arm 96 can rotate relative to the frame 24 about a third pivot point $C_F$. With this construction, multiple pivoting movements are permitted by the front suspension sub-assembly 80, including about the first-third pivot points $A_F$-$C_F$, that combine with the front shock absorber 90 to isolate movements at the ski assembly 26a from the frame 24 and thus the cabin 22.

The rear suspension sub-assembly 82 can include a rear shock absorber 110, a rear suspension arm 112, a rear rocker 114 and a link arm 116. The rear shock absorber 110 can be of a conventional design including a reciprocal piston 120 within a cylinder 122 and spring 124 combination. The rear shock absorber 110 is connected at a lower end to the ski assembly 26a (e.g., via one of the cross-bars 78 shown in FIG. 2). An upper end of the rear shock absorber 110 is pivotably attached to the rear rocker 114 that in turn is connected to the frame 24 by a sub-carriage (not shown). The rear rocker 114 can pivot relative to the rear shock absorber 110 about a first pivot point $A_R$. The rear suspension arm 112 is also pivotably mounted to the rear rocker 114, such that the rear suspension arm 112 can pivot relative to the rear rocker 114 about a second pivot point $B_R$. The rear suspension arm 112 extends rearwardly from the second pivot point $B_R$ and is pivotably connected at an opposite end thereof to the link arm 116. The rear suspension arm 112 and the link arm 116 can rotate relative to one another about a third pivot point $C_R$. The link arm 116 is pivotably connected to the ski assembly 26a (e.g., via another one of the cross-bars 78 shown in FIG. 2) such that the link arm 116 can rotate relative to the ski assembly 26a about a fourth pivot point $D_R$. With this construction, multiple pivoting movements are permitted by the rear suspension sub-assembly 82, including about the first-fourth pivot points $A_R$-$D_R$, that combine with the rear shock absorber 110 to isolate movements at the ski assembly 26a from the frame 24 and thus the cabin 22.

The connecting rod 84 interconnects the front and rear suspension arms 92, 112 at first and second pivots 130, 132, respectively. The connecting rod 84 serves to stabilize motions of the suspension sub-assemblies 80, 82 relative to one another. In this regard, the pivots 130, 132 can be laterally off-set from one another relative to a horizontal plane of the frame 24 (i.e., the first pivot 130 is laterally above the second pivot 132 relative to the ski assembly 26a), promoting an overall stability of the ski assembly 26a relative to the frame 24 (and thus the cabin 22).

Returning to FIGS. 1A and 1B, though not shown, the first and second suspension assemblies 28a, 28b can be interconnected to one another in a manner that promotes tandem turning movements of the ski assemblies 26a, 26b as the trailer system 20 is towed behind a vehicle. In some embodiments, a double link independent suspension arrangement can be provided as described, for example, in U.S. Pat. No. 6,899,191 to Lykken, the entire teachings of which are incorporated herein by reference. In this manner, then, the trailer system 20 will readily track behind the towing vehicle and will not "sway" when the towing vehicle turns. In related embodiments, the trailer system 20 can incorporate an actuated ski suspension, for example as described in the '191 Patent, that facilitates raising and lowering of the cabin 22 relative to the ski assemblies 26a, 26b (and thus relative to the ground surface on which the ski assemblies 26a, 26b reside). With these and similar optional embodiments, the cabin 22 can be raised and lowered relative to ground by user-prompted operation of an activation device (e.g., to render the cabin 22 handicap accessible, to facilitate use of the cabin 22 as an ice fishing house, etc.).

Regardless of whether raising/lowering capabilities are provided, the suspension assemblies 28a, 28b (and components interconnecting the suspension assemblies 28a, 28b) are optionally configured and arranged to distribute weight across a length of the corresponding ski assemblies 26a, 26b in a manner that avoids overt tilting of the trailer system 20 when connected or hitched to a towing vehicle (not shown) at the tongue 30. For example, the suspension assemblies 28a, 28b are configured and assembled between the cabin 22 and the ski assemblies 26a, 26b such that approximately 51-60% of the load of the trailer system 20 (prior to loading of any passengers or supplies) is displaced along a rear or trailing portion of the length of each ski assembly 26a, 26b, and 40-49% is displaced along a forward or leading portion of the length. In some embodiments, approximately 55% of the load is along the trailing portion, and approximately 45% of the load is along the leading portion. With this optional configuration, when weight is added to the cabin 22 at expected levels (e.g., multiple passengers, equipment, supplies, etc.) and at least a majority of this weight is forward of a center of gravity of the cabin 22, the suspension assemblies 28a, 28b will compensate for the added forward weight, and prevent or avoid forward "tilting" of the trailer system 20 relative to the towing vehicle.

Figure 4:
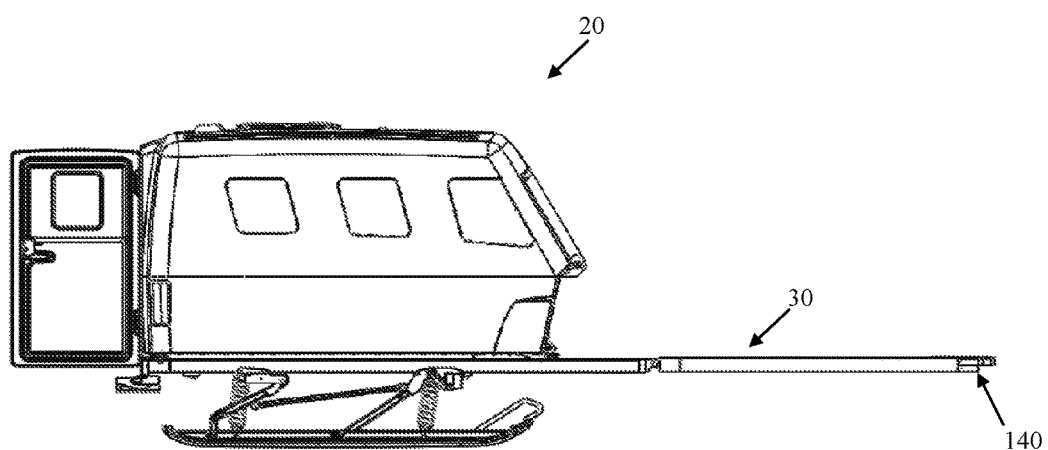
FIG. 4 is a side view of the trailer system of FIGS. 1A and 1B.

The tongue 30 is optionally pivotably connected to the frame 24, with FIGS. 1A and 1B reflecting a folded or non-use state of the tongue 30. The tongue 30 can include or carry one or more connection features or components 140 (referenced generally) appropriate for coupling with the hitch provided with the towing vehicle (not shown). In some embodiments, the tongue 30 is configured for connection to the hitch unit provided with the SNOBEAR™ or THE GRIZZ™ snow and ice recreational vehicles available from Sno Bear USA, LLC. In related embodiments, the trailer system 20 is configured such that in the unfolded or use state of the tongue 30 (shown in FIG. 4), the connection features 140 are located at a height corresponding with a height of the hitch unit provide the SNOBEAR™ and THE GRIZZ™ vehicles.

The trailer systems of the present disclosure provide a marked improvement over previous designs. The trailer systems are highly versatile, appropriate for transporting multiple passengers and their equipment/supplies in a comfortable, fully enclosed space over ice, snow, marshes and other harsh terrains for long distances. The trailer systems provide a stable ride over rough terrains. Further, the trailer systems of the present disclosure are buoyant, able to float even when loaded with passengers and/or supplies.

Although the present disclosure has been described with reference to preferred embodiments, workers skilled in the art will recognize that changes can be made in form and detail without departing from the spirit and scope of the present disclosure.

What is claimed is:

1. A trailer system comprising:
   a cabin forming an enclosed area sized and shaped for occupancy by at least two adult passengers;
   a frame supporting the cabin;
   first and second ski assemblies;
   first and second suspension assemblies connecting the ski assemblies, respectively, with the frame, wherein the first suspension assembly is connected to the frame at first and second coupling points, the first and second coupling points being located at opposite sides of a center of gravity of the cabin;
   wherein the first suspension assembly includes a front suspension sub-assembly including a front shock absorber comprising a piston, cylinder and spring;
   and further wherein a first end of the front shock absorber is pivotably coupled to the first ski assembly;
   and even further wherein the front suspension sub-assembly is configured to provide a plurality of pivot points between a second end of the front shock absorber and the frame.

2. The trailer system of claim 1, wherein the cabin includes a housing formed by a foam-filled wall configured to render the trailer system buoyant in water.

3. The trailer system of claim 2, wherein the foam of the foam-filled wall exhibits floatation properties on the order of 64 lbs/ft$^3$ buoyancy.

4. The trailer system of claim 1, wherein the suspension assemblies are configured and arranged relative to the cabin to distribute at least 51% of a load of the cabin along a trailing length of each of the ski assemblies.

5. The trailer system of claim 1, wherein the first suspension assembly further includes a rear suspension sub-assembly, and further wherein the rear suspension sub-assembly includes a rear shock absorber comprising a piston, cylinder and spring.

6. The trailer system of claim 5, wherein a first end of the rear shock absorber is pivotably coupled to the first ski assembly, and further wherein the rear suspension sub-assembly is configured to provide a plurality of pivot points between a second end of the rear shock absorber and the frame.

7. The trailer system of claim 6, wherein the rear suspension sub-assembly further includes a link arm between the first end of the rear shock absorber the first ski assembly.

8. The trailer system of claim 7, wherein the first end of the rear shock absorber is pivotably coupled to the link arm, and the link arm is pivotably coupled to the first ski assembly.

9. The trailer system of claim 6, wherein the first suspension assembly further includes a connecting rod apart from the first ski assembly and the frame, a first end of the connecting rod pivotably coupled to the front suspension sub-assembly and an opposing, second end of the connecting pivotably coupled to the rear suspension sub-assembly.

10. The trailer system of claim 1, wherein the front suspension sub-assembly further includes:
   a front suspension arm pivotably connected to the second end of the front shock absorber and to the first ski assembly;
   a front rocker pivotably connected to the second end of the front shock absorber; and
   a link arm pivotably connected to the front rocker and to the frame;
   wherein the front suspension arm and the front rocker are rotatable relative to each other and relative to the front shock absorber about a first pivot point;
   and further wherein the front rocker and the link arm are rotatable relative to one another about a second pivot point;
   and even further wherein the link arm is rotatable relative to the frame about a third pivot point.

11. The trailer system of claim 10, wherein the first suspension assembly further includes a rear suspension sub-assembly comprising:
   a rear shock absorber comprising a piston, cylinder and spring;
   a rear suspension arm;
   a rear rocker; and
   a rear link arm;
   wherein:
      a first end of the rear shock absorber is connected to the first ski assembly,
      an opposing second end of the rear shock absorber is pivotably connected to the rear rocker;
      the rear rocker is connected to the frame and can pivot relative to the rear shock absorber about a first rear pivot point;
      the rear suspension arm is pivotably connected to the rear rocker such that the rear suspension arm can pivot relative to the rear rocker about a second rear pivot point,
      the rear suspension arm is pivotably connected to the rear link arm such that the rear suspension arm can rotate relative to the rear link arm about a third rear pivot point,
      the rear link arm is pivotably connected to the first ski assembly such that the rear link arm can rotate relative to the first ski assembly about a fourth rear pivot point.

12. The trailer system of claim 11, wherein the first suspension assembly further comprises a connecting rod pivotably connected to the front suspension arm and to the rear suspension arm.

13. The trailer system of claim 12, wherein the connecting rod is coupled to the front suspension arm at a first rod pivot point, and further wherein the connecting rod is coupled to the rear suspension arm at a second rod pivot point, and even further wherein the first rod pivot point is laterally off-set from the second rod pivot point.

14. The trailer system of claim 13, where relative to an upright orientation of the trailer system, the first rod pivot point is laterally above the second rod pivot point.

* * * * *